United States Patent [19]
Mosier

[11] Patent Number: 4,714,715
[45] Date of Patent: * Dec. 22, 1987

[54] METHOD OF FORMING FIRE RETARDANT INSULATING MATERIAL FROM PLASTIC FOAM SCRAP AND THE RESULTANT PRODUCT

[76] Inventor: Benjamin Mosier, 8330 Westglen Dr., Houston, Tex. 77063

[*] Notice: The portion of the term of this patent subsequent to Jun. 24, 2003 has been disclaimed.

[21] Appl. No.: 837,185

[22] Filed: Mar. 7, 1986

Related U.S. Application Data

[63] Continuation-in-part of Ser. No. 609,482, May 11, 1984, Pat. No. 4,596,682.

[51] Int. Cl.[4] .................. B29C 67/72; B29C 67/16; B29C 39/10; B29C 65/04
[52] U.S. Cl. ......................... 521/54; 264/26; 264/45.3; 264/53; 264/DIG. 2; 264/DIG. 7; 521/136; 521/181
[58] Field of Search ............ 264/DIG. 7, 26, 25, 264/DIG. 2, 53, 45.3

[56] References Cited

U.S. PATENT DOCUMENTS

| | | | |
|---|---|---|---|
| 3,251,916 | 5/1966 | Newnham et al. | 264/128 |
| 3,577,363 | 5/1971 | Klug | 264/45.3 X |
| 3,630,787 | 12/1971 | Consolloy | 136/177 |
| 3,640,787 | 2/1972 | Heller | 156/77 |
| 3,662,043 | 5/1972 | Rubens | 264/DIG. 7 |
| 3,821,337 | 6/1974 | Bunclark et al. | 264/26 |
| 3,855,049 | 12/1974 | Klein | 264/DIG. 7 |
| 4,079,170 | 3/1978 | Cluff | 428/484 |
| 4,243,761 | 1/1981 | Savey | 264/DIG. 2 |
| 4,256,803 | 3/1981 | Savey et al. | 264/DIG. 2 |
| 4,273,887 | 6/1981 | Wolff | 264/26 X |
| 4,596,682 | 6/1986 | Mosier | 264/26 |

*Primary Examiner*—Philip Anderson
*Attorney, Agent, or Firm*—Tilton, Fallon, Lungmus & Chestnut

[57] ABSTRACT

Fire retardant polystyrene insulating material is manufactured from expandable polystyrene scrap in admixture with a phenol-formaldehyde or melamine-formaldehyde resin in resole form, the resin containing a blowing agent and a surfactant. The insulating material is formed from the scrap-resin mix by applying dielectric heating to foam the resin, and cure the foamed resin to a closed cell structure.

14 Claims, 2 Drawing Figures

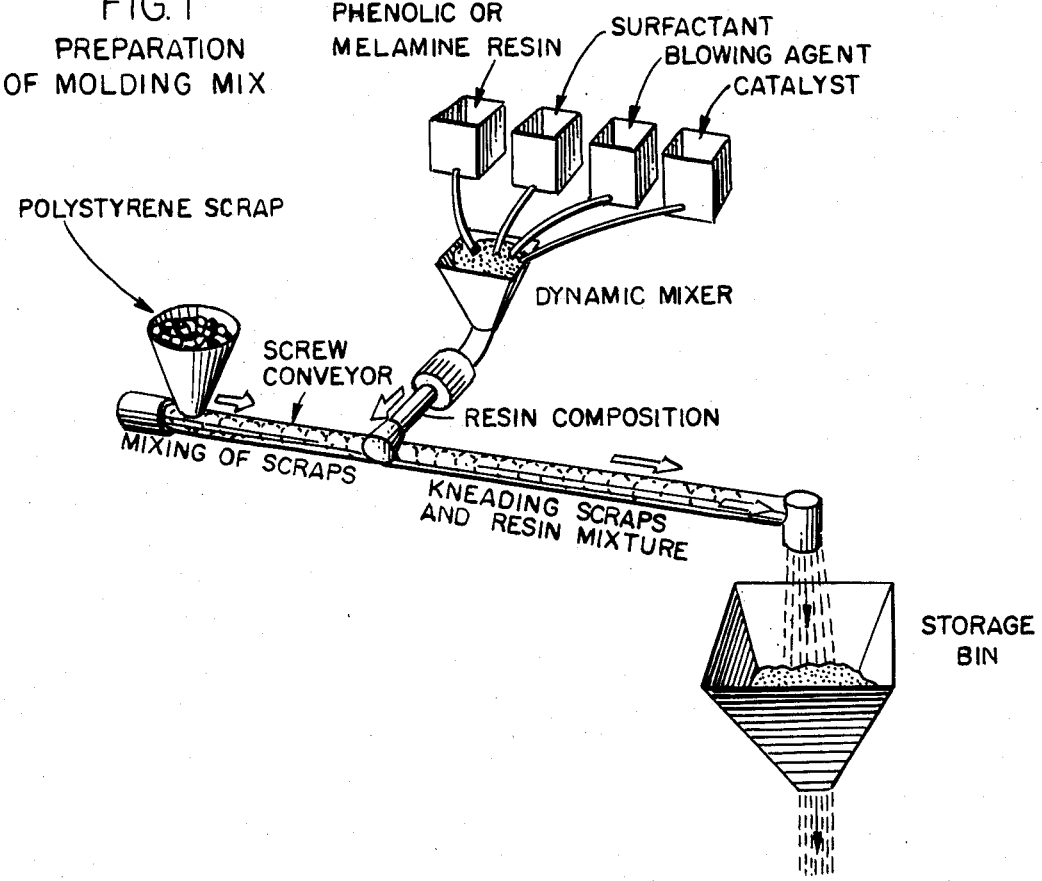
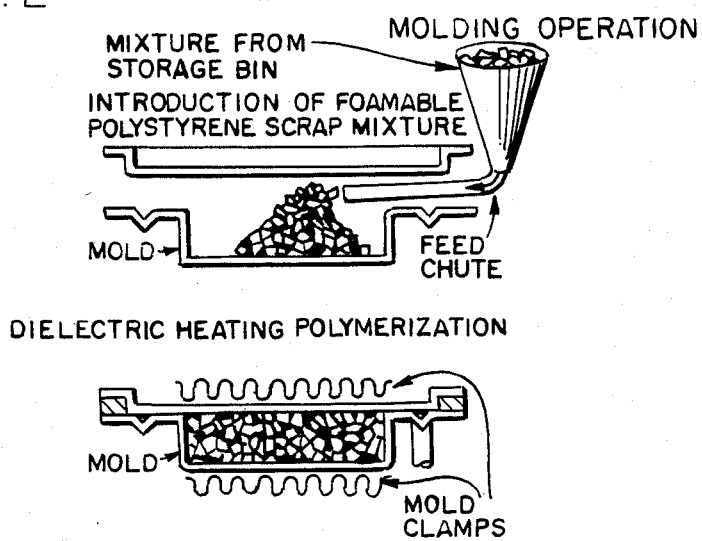

METHOD OF FORMING FIRE RETARDANT INSULATING MATERIAL FROM PLASTIC FOAM SCRAP AND THE RESULTANT PRODUCT

RELATED APPLICATION

This application is a continuation-in-part of my prior application Ser. No. 609,482, filed May 11, 1984, which issued June 24, 1986 as U.S. Pat. No. 4,596,682.

FIELD OF INVENTION

The field of this invention relates particularly to expanded polystyrene insulation material, and more generally to insulation material produced from admixtures of plastic foam beads or foam scrap with binders or fillers.

BACKGROUND OF INVENTION

Polystyrene is produced in an expandable granular form referred to as polystyrene "beads." The beads have a closed cellular structure and contain an expanding agent such as pentane. The beads may be formed into integrated bodies, such as sheets or slabs by a molding process in which steam and heat are applied to cause the beads to soften, expand and integrate. In most applications, the beads are subjected to a pre-expansion before being formed into the molded bodies, the beads being only partially expanded during the pre-treatment. Polystyrene insulating board as presently produced from such beads usually does not contain any additional binders or fillers. However, the patent literature contains some descriptions of such composites.

In the process described in U.S. Pat. No. 3,154,604, pre-expanded polystyrene beads are combined with a thermoplastic polymeric bonding agent that is adapted to flow at a temperature lower than the expansion temperature range of the beads. This mixture is mechanically preformed at a temperature at which the thermoplastic is flowable but below a temperature at which the beads expand. Thereafter, the preformed mass is subjected to heat to expand the beads.

The U.S. Pat. No. 3,251,916 discloses the formation of composite bodies from expanded polystyrene and a polyurethane binder. The polystyrene beads are expanded before being mixed with the binder.

U.S. Pat. No. 4,079,170 describes the impregnation of a pre-formed sheet of expanded polystyrene with a wax composition, the liquified wax being forced into the sheet under pressure and hardened by cooling.

U.S. Pat. No. 3,577,363 discloses a process for combining urea-formaldehyde resin with polystyrene beads. The mix is formed in molds for heating in stages of increasing temperature. The process results in opening the cells of the polystyrene beads.

U.S. Pat. No. 4,256,803 describes the combining of phenolic resin with polystyrene. The resin contains a foaming agent. After forming the mix, a stage heating procedure is employed. Polystyrene is one of a number of fillers that can be employed.

U.S. Pat. No. 3,630,787 describes a process in which polystyrene granules are precoated with an epoxy resin and thereafter formed into molded bodies. In the molding process, the mix is compressed sufficiently to press the binder into and around the beads. The final curing stage can be carried out in a furnace or by exposure to a high-frequency alternating electric field (viz. microwave heating).

One of the known disadvantages of expanded polystyrene insulation is that it is a flammable material which can contribute to fire spreading. The incorporation of fire retardant chemical has been proposed, but such chemicals increase the cost of the insulating material. Further, the incorporation of fire retardant chemicals may interfere with the self-bonding of the polystyrene beads during the manufacture of the board, thereby reducing the mechanical strength of the insulation and increaings its friability. Heretofore, no method has been proposed whereby the fire resistance of polystyrene bead insulation can be appreciably increased at minimal additional cost, and with substantial improvement in other desirable properties.

The manufacture of polystyrene insulating board by integration and expansion of polystyrene beads without the use of a binder results in molded board products requiring shaping by trimming. Large quantities of such trimmings, referred to as "polystyrene scrap", accumulate as a waste by-product in connection with polystyrene board manufacturing operations. Presently, there is little use for such polystyrene scrap. It is employed to some extent as a packaging material, and other uses are being sought. Most of the polystyrene scrap is understood to be disposed of by burning.

Foam plastic scrap is also available from other sources. Foam plastic bodies which are molded and then cut or trimmed are made from a number of other plastics besides polystyrene. These include polystyrene-polyethylene copolymers, polyethylene, acrylonitrile butadien styrene (ABS) copolymers, polyurethane, polypropylene epoxy, polyvinylchloride, polyimides, and silicones. All of these foamed waste materials have relatively little use at present and tend to be materials of low fire retardancy.

SUMMARY OF INVENTION

This invention provides a new and potentially important use for polystyrene scrap. By the method of this invention, the trimmings from polystyrene board operations can be formed into fire-retardant insulating materials. This scrap is comminuted into pieces of relatively small size, and the comminuted scrap is combined with a heat-foamable thermosetting resin composition to prepare a moldable mix. The resin component is a phenyl-formaldehyde or melamine-formaldehyde resin in "resole" form. The mix also contains a blowing agent and a surfactant. Portions of the moldable mixture are placed in enclosed molds, dielectric heating is applied for rapidly foaming the resin and curing it to a predominately closed cell structure. The resulting products may be used as substitutes for ordinary polystyrene board, providing advantages of increased fire retardancy and improved physical properties.

Polystyrene scrap may be used alone or in admixture with foam plastic scrap formed from other plastics. Alternatively, if sufficient amount of the foam plastic scrap from other sources is available, it can be employed to prepare scrap foam plastic board in accordance with the present invention.

The resulting molded bodies, which may be in the form of sheets or slabs, have greatly improved fire retardant properties as determined by the standard flame spread test. The limiting oxygen index is also improved. Further, the cost per cubic foot for insulating material of the same density is substantially less than with polystyrene beads alone. Other important properties are appreciably improved, including a reduction in thermal conductivity, and major improvement with respect to dimensional change under varying temperatures.

THE DRAWINGS

The method of the present invention and the products produced thereby are illustrated in the accompanying drawings, wherein FIG. 1 is a diagrammatic perspective view of an apparatus and method for preparing the molding mix; and FIG. 2 is a same sequential illustration of the molding operation of the present invention.

DETAILED DESCRIPTION

One of the starting materials for the method of this invention is referred to as "polystyrene scrap." This consists of trimmings obtained in the manufacture of polystyrene board by the integration of expandable polystyrene beads without a binder. Most of the trimmings are in the form of strips, chunks, etc. In the first step of the process, the polystyrene scrap is comminuted to reduce it to pieces of smaller size. For example, the polystyrene scrap may be ground in a hammer mill to pieces having a maximum diameter of less than one inch. A mix of pieces of varying sizes is useable, that is, a high degree of size uniformity is not required. A suitable general size range comprises pieces having a maximum diameter within the range from about $\frac{1}{8}$ to $\frac{3}{4}$ inches. The polystyrene beads will have been expanded in the process of making the polystyrene board from which the scrap is obtained. The polystyrene of the scrap material may still be subject to some further expansion, but this property while desirable is not essential for the purposes of this invention.

Other rigid plastic foam scrap material which may be used in admixture with the polystyrene foam scrap or in some cases as a substitute for the polystyrene foam scrap include foam products prepared from polystyrene-polyethylene copolymers, polyethylene (high, medium and low densities), acrylonitrile-butadiene styrene (ABS) copolymer, polyurethane, polypropylene epoxy, polyvinylchloride, polyimides and silicones. Scrap material formed from these plastics, however, is available in lesser quantities than polystyrene scrap, and would ordinarily be employed in admixture with polystyrene scrap, the admixture containing 50% by volume or more of the polystyrene scrap in relation to the other foam scrap ingredients.

The other primary ingredient of the fire retarding insulation material of this invention is a heat-foamable thermosetting resin composition. The resin component is preferably a phenol-formaldehyde resin, a melamine-formaldehyde resin, or mixtures thereof. For example, four parts by weight of the phenolic resin to one part of the melamine resin may be used.

The resins are preferably employed in the form of "resoles", namely, A-stage resins. The resoles are water-soluble and contain a predominance of methylol groups. Phenolic and melamine resins are available commercially in the form of resoles. For example, phenol-formaldehyde resoles are sold by Clark Chemical Corp., Blue Island, Illinois, by Ashland Chemical Company, Columbus, Ohio, and others. Suitable melamine-formaldehyde resins in the form of resoles are available commercially from the Melamine Division of Ashland Chemical Company.

The volume of resin to pre-expanded beads in the molding mix may range from 10 to 150 parts by volume of resin to 100 parts scrap. Preferred proportions are from 25 to 100 parts of the resin per 100 parts by volume of the polystyrene scrap.

The resin composition in addition to the resin as described above preferably should also include a blowing or foaming agent, a catalyst, and a surfactant. For example, the blowing agent may be trichlorofluoromethane (Freon 11), trichlorotrifluoroethane (Freon 113), n-pentane, or methylene chloride; the catalyst may be phenolsulfonic acid or toluene sulfonic acid; and the surfactant may be sorbitan monooleate with 20 moles ethylene oxide, sorbitan monolaurate with 20 moles ethylene oxide, or comparable surfactant.

Examples of preferred thermosetting resin compositions are as follows:

| Ingredients | Wt. % |
|---|---|
| Formula A | |
| Phenolic resin (resole) | 80 |
| Sorbitan monooleate with 20 moles of ethylene oxide | 4 |
| Freon 11 | 8 |
| Phenolsulfonic acid (65% w/w as PSA) | 8 |
| Formula B | |
| Melamine formaldehyde resin | 82 |
| Sorbitan monolaurate with 20 moles of ethylene oxide | 2.5 |
| Freon 11 | 5.8 |
| Freon 113 | 2.5 |
| Phenolsulfonic acid (65% w/w as PSA) | 7.2 |

Usually it would be preferable to preform the resin composition, combining the resin, surfactant, blowing agent and catalyst, and then combining this composition with the polystyrene beads. Since the resin composition will be in liquid form, it may be admixed with the beads in a mixer apparatus, such as paddle mixers, or screw conveyors providing a mixing-kneading action. The resulting premix of the comminuted polystyrene scrap and resin provides a moldable mixture, which can be formed into sheets, slabs, and the like for use as insulating material. The molding composition is preferably used as prepared in a continuous operation, but the molding composition can be held at room temperature for 30 to 60 minutes if necessary prior to molding.

In the molding operation, the molding composition is charged to molds, such as rectalinear molds, which are provided with heating means. After the molds are closed and locked to withstand pressure, heat is applied, such as by dielectric heating means. In general, the temperature employed in the molding operation should be sufficient to foam the resin composition, expand the beads, and cure the resin. Temperatures of from 100° to 150° F. will usually be sufficient for the molding operation. The molding time will vary with the heating means, but where dielectric heating is employed, molding times of as short as from 10 to 60 seconds. During the molding operation, the resin further polymerizes, reaching the final C-stage of resin polymerization. In the final product, the resin substantially fills the void spaces between the polystyrene beads effectively coating or "encapsulating" the beads, such as the preferred mixture of large and small beads, as described above.

During the molding operation, if desired, various substrates may be adhesively attached to the upper and/or lower surfaces of the molded slabs. For example, the upper layer may comprise wood fiber board impregnated with asphalt and the lower facing layer pressed wood. A wide variety of other facing materials can be used, including aluminum foil, wood, sheet rock, steel, cardboard, fabric, filberboard, fiberglass, etc.

EXPERIMENTAL EXAMPLES

For the purpose of testing the properties of insulation material prepared by the method of this invention, samples were prepared from a phenol-formaldehyde resin and polystyrene board trimmings. The scrap was ground to obtain a mixture of pieces ranging in size from ⅛ to ¾ inches. The communited scrap was combined with the resin in the following proportions by volume. (1) 3 parts resin with 1 part scrap; and (2) 1 part resin with 1 part scrap. Mix (1) was therefore 25% resin before foaming, and Mix (2) 50% resin. A resin composition like Formula A above was used. The molding mixture was charged to molds equipped with dielectric heating means, and molded therein into rectalinear blocks, using a molding temperature of approximately 125°–150° F. Specimens from each of the mold mixtures were then tested for physical properties. The results are summarized below in Table A, which includes a comparison with a standard commercial polystyrene board. The phenolic resin used was a resole resin.

As shown in Table A, the encapsulated polystyrene samples had a closed cell content of at least 90%, showing the binder cell structure was also essentially closed cell.

TABLE A

|  | Polystyrene Board | Mix (1) (1:3) | Mix (2) (1:1) |
| --- | --- | --- | --- |
| Density (#/ft$^3$) | 1.25 | 1.55 | 1.80 |
| Thermal Conductivity (BTU/hr/°F./in/ft$^2$) | 0.23 | 0.21 | 0.20 |
| Coefficient Linear Expansion ($\times 10^{-6}$) | 80 | 20 | 25 |
| Closed Cell Content % | 90–95 | 90–95 | 90–95 |
| Dimensional Stability Shrinkage (at 80° C.) | 0.5 | <0.5 | <0.5 |
| Limiting Oxygen Index (LOI) | 17 | 22 | 28 |
| Compressive Strength (#/in$^2$) | 25 | 26 | 30 |
| Thermal Stability | 20–25 | 10–15 | <10 |
| Smoke Density (NBS Chamber %) | >10 | <10 | <10 |

I claim:

1. The method of forming fire retardant insulation material from rigid plastic foam scrap, comprising:
   (a) comminuting said scrap to obtain pieces having maximum dimensions of less than one inch;
   (b) preparing a moldable mixture of said comminuted scrap with a heat-foamable thermosetting resin composition, the resin component of said composition being selected from the class consisting of phenol-formaldehyde and melamine-formaldehyde resins, said resin being in resole form and containing a blowing agent and a surfactant, from 10 to 150 parts by volume of said resin being present per 100 parts of said scrap in said mix; and
   (c) applying dielectric heating to said moldable mixture in enclosed molds to obtain integrated molded bodies composed of resin-encapsulated scrap pieces, said dielectric heating being effective for rapidly foaming said resin and curing it to a predominately closed cell structure surrounding said scrap pieces.

2. The method of claim 1 in which said resin is a phenol-formaldehyde resin, and is employed in an amount of from 25 to 100 parts by volume per 100 parts of said scrap.

3. The method of claim 1 in which said resin is a melamine-formaldehyde resin, and is employed in an amount of from 25 to 100 parts by volume per 100 parts of said scrap.

4. The fire retarding insulating material produced by the method of claim 1.

5. The method of claim 1 in which said dielectric heating is at a temperature of about 100° to 150° F. and is completed in 10 to 60 seconds.

6. The fire retarding insulating material produced by the method of claim 5 which is further characterized by the cured resin foam thereof having a closed cell content of the order of 90 to 95%.

7. The method of claim 1 in which said scrap is comminuted to pieces having maximum dimensions in the range of ⅛ to ¾ inches, and said resin is employed in an amount of 25 to 100 parts by volume per 100 parts of said scrap.

8. The method of forming fire retardant insulation material from foamed polystyrene scrap obtained as trimmings in the manufacture of foamed polystyrene board by the integration of expandable polystyrene beads without a binder, comprising:
   (b) preparing a moldable mixture of said comminuted scrap with a heat-foamable thermosetting resin composition, the resin component of said composition being selected from the class consisting of phenol-formaldehyde and melamine-formaldehyde resins, said resin being in resole form and containing a blowing agent and a surfactant, from 10 to 150 parts by volume of said resin being present per 100 parts of said polystyrene scrap in said mix; and
   (c) applying dielectric heating to said moldable mixture in enclosed molds to obtain integrated molded bodies composed of resin-encapsulated scrap pieces, said dielectric heating being effective for rapidly foaming said resin and curing it to a predominately closed cell structure surrounding said scrap pieces.

9. The method of claim 8 in which said resin is a phenol-formaldehyde resin, and is employed in an amount of from 25 to 100 parts by volume per 100 parts of said polystyrene scrap.

10. The method of claim 8 in which said resin is a melamine-formaldehyde resin, and is employed in an amount of from 25 to 100 parts by volume per 100 parts of said foamed polystyrene scrap.

11. The fire retarding insulating material produced by the method of claim 8.

12. The method of claim 8 in which said dielectric heating is at a temperature of about 100° to 150° F. and is completed in 10 to 60 seconds.

13. The fire retarding insulating material produced by the method of claim 12 which is further characterized by the cured resin foam thereof having a closed cell content of the order of 90 to 95%.

14. The method of claim 8 in which said foamed polystyrene scrap is comminuted to pieces having maximum dimensions in the range of ⅛ to ¾ inches, and said resin is employed in an amount of 25 to 100 parts by volume per 100 parts of said polystyrene scrap in said mix.

* * * * *